United States Patent [19]
White

[11] Patent Number: 5,955,163
[45] Date of Patent: Sep. 21, 1999

[54] GASKET COMPOSITION FOR CROWN CAPS

[75] Inventor: Steven Andrew Carl White, Huntingdon, United Kingdom

[73] Assignee: W.R. Grace & Co.-Conn., New York, N.Y.

[21] Appl. No.: 08/739,488

[22] Filed: Oct. 28, 1996

Related U.S. Application Data

[63] Continuation of application No. 08/442,442, May 16, 1995, abandoned, which is a continuation of application No. 08/162,035, Apr. 28, 1994, abandoned.

[30] Foreign Application Priority Data

Jun. 5, 1991 [EP] European Pat. Off. ............ 913005090
Mar. 27, 1992 [GB] United Kingdom ................... 9206701

[51] Int. Cl.⁶ .................................................... B65D 41/42
[52] U.S. Cl. ......................... 428/35.7; 220/288; 220/304; 220/378; 215/256
[58] Field of Search .......................... 428/35.7; 220/288, 220/304, 378; 215/256

[56] References Cited

U.S. PATENT DOCUMENTS

| | | | |
|---|---|---|---|
| 3,779,965 | 12/1973 | Lefforge et al. | 260/28.5 |
| 4,431,111 | 2/1984 | Prohaska | 215/256 |
| 4,833,206 | 5/1989 | Tajima | 525/187 |

FOREIGN PATENT DOCUMENTS

| | | |
|---|---|---|
| 0129309 | 4/1984 | European Pat. Off. . |
| 0174032 | 9/1985 | European Pat. Off. . |
| 0349305 | 6/1989 | European Pat. Off. . |
| 2108943 | 7/1982 | United Kingdom . |

OTHER PUBLICATIONS

Derwent Abstract of JP 48014708; "Packing Material for Crown Caps".

Derwent Abstract of J04031254 Feb. 03, 1992; "Metal Cap Liner for Heat ... ".

*Primary Examiner*—Charles Nold
*Attorney, Agent, or Firm*—Craig K. Leon; William L. Baker

[57] ABSTRACT

A gasket for a crown cap to be used on a carbonated beverage, especially a twist-off crown or for a bottle which is to be pasteurized, is formed of a thermoplastic material, which is preferably free of polyvinyl chloride, and which contains a hydrogenated copolymer of styrene and a conjugated diene, or a functionalized derivative thereof. The material is resistant to heat, and provides a gasket with advantageous sealing properties.

13 Claims, No Drawings

GASKET COMPOSITION FOR CROWN CAPS

This is a continuation of application Ser. No. 08/442,442, filed on May 16, 1995, abandoned, which is a continuation of application Ser. No. 08/162,035 filed Apr. 28, 1994, now abandoned.

The present invention relates to a new composition for forming a gasket in a crown cap, especially useful for twist-off crown caps which are used to close filled bottles which are subsequently to be pasteurised, as well as a process for forming the gasket.

A wide variety of processes and compositions have been proposed for forming the gasket in crown caps. These include introducing the gasket forming material into the cap in the form of plastisol, a solution in organic solvent, an aqueous dispersion (including aqueous latices) and mouldable thermoplastic compositions. An early disclosure of the use of thermoplastic compositions for forming container closures is in GB-A-1,112,023 and GB-A-1,112,025. Each of those specifications describe a wide variety of introducing the compositions into the cap and a wide variety of thermoplastic compositions that can be used.

Methods that are described in these two patents which were known at that time include inserting and bonding a preformed uniform disc into the cap, inserting and bonding a preformed contoured disc into the cap, flowing a composition into the cap while rotating it and optionally moulding it, flowing a composition into the cap and moulding it while the composition is still hot, transferring a disc of composition from a carrier backing onto a metal plate which is then formed into a closure, transferring composition by a moulding die and moulding it into the cap, compression moulding the composition into the cap, and so on. In the new method described in detail in '023, the composition was formed into a sheet, discs were cut from it and the discs were then inserted into the preheated caps and cold moulded into the caps. In many of the examples the inserted disc had a diameter substantially the same as the diameter of the cap.

Thermoplastic compositions that were described include blends of ethylene vinyl acetate (EVA) and micro crystalline wax, EVA and low density polyethylene (LDPE) having a melt flow index (MFI) of 7, similar blends containing also butyl rubber having Mooney viscosity of 70, a blend of equal amounts of LDPE having MFI 7 with butyl rubber having Mooney 70, blends of different types of EVA, a blend of LDPE with polyisobutylene, a blend of EVA with ethylene propylene copolymer, an ethylene acrylic acid ester copolymer, a blend of this with LDPE, a blend of LDPE with ethylene propylene copolymer, and a blend of LDPE with chloro sulphonated polyethylene.

Various disclosures of forming gaskets from thermoplastic compositions have appeared from time to time since then and these have listed a wide variety of polymers that can be used. Generally, most of the polymers named above have been listed. An example is EP 331,485 in which molten material is positioned in the cap while still molten (or semi molten) and is moulded into the cap.

In practice, the thermoplastic compositions that have been proposed and used most widely as gaskets for containers are compositions of polyethylenes, ethylene vinyl acetate polymers, and blends thereof. None of the others have attracted any great commercial interest, presumably because of perceived difficulties in making or using the compositions or in their performance.

Of the very wide range of polymeric gasket materials that have been available in recent years, the type that has been most widely used for crown caps is based on polyvinyl chloride plastisol. The use of polyvinyl chloride in contact with potable or edible materials has in recent years been considered to be undesirable by some authorities.

PVC-free sealing compositions for bottle gaskets were described by DS-Chemie in EP-A-0250057.

In Die Brauwelt, 3, 1991, pages 47 and 48 it is stated "PVC compounds for crown closures are under attack, not only because of their PVC content, but also because of the plasticisers, which are the other main component of the (compound) formula. According to a communication from DS-Chemie, Bremen, PVC-free technology, amongst other, is based on the following raw materials: polyethylene, polypropylene, EVA, various rubber types such as SBS, SIS, butyl-rubber. Depending on the combination of these various raw materials the properties, essential for the beverage industries, can be obtained".

This article mentioned certain effects such as reduced pressure-holding, oxygen barrier, and chloroanisole barrier effects. No actual compositions are described in the article. The polymers listed in this article are typical of those previously listed for possible use in PVC-free closures and so this article merely outlines the problems and does not offer any solution to these problems.

In our earlier applications, European 91305090.2, 91305089.4 and 91305091.0 unpublished at the priority date of the present case, we describe a gasket for a beer bottle closure which comprises thermoplastic polymeric material which is a homogeneous blend of 20–60% by weight of butyl rubber and 40–80% by weight of other thermoplastic polymer. The incorporation of butyl rubber provides a gasket which seals against the mouth of the bottle and withstands internal pressures of up to 5 or 7 bar (500 or 700 kPa), but that vents at internal pressures of between 5 and 12 bar (500–1200 kPa). The gasket allows the pressure to be vented, for instance during processing or, especially, on storage, and reseals against the mouth of the bottle. The use of butyl rubber further prevents ingress of oxygen and volatile odours (especially chloro-anisole and chlorinated phenols) which can be a particular problem where the bottle contains beer. There is a problem with gaskets containing a large amount of butyl rubber in that the venting pressure may be reduced to a value which is too low for certain applications.

One type of crown cap is a so-called pry-off cap which has to be levered off using an opening tool. There is another type of crown cap, known as a twist-off crown. This can simply be unscrewed or twisted off. The bottle to which such crown is applied comprises a small 4-start thread, but the crown cap is crimped on to the bottle in the usual manner. One significant difference between a pry-off and a twist-off crown is that a twist-off crown is made from thinner metal, in order that it conforms to the special bottle neck, typically 0.22 mm compared with 0.24–0.30 mm for a standard crown.

The reduced thickness of a twist-off crown makes pressure retention by the gasket more difficult since the crown tends to dome when subjected to high internal pressures within the bottle. Although PVC-based compositions may provide adequate gaskets in both pry-off and twist-off crowns, the non-PVC thermoplastic compositions which are able to provide good sealing in a pry-off crown are found to give inadequate sealing, and low venting pressures, when used for twist-off crowns. We have found a particular problem when butyl rubber is used as described in our copending application No. 91305089.4 in that the venting pressure may be reduced by the butyl rubber to a value which is too low for some applications.

U.S. Pat. No. 5,060,818 (and JP-A-2-057569 (1990)) describes a gasket for a screw cap including a twist-off cap which is stated to be resistant to deformation under conditions of high temperature during for instance sterilisation, comprising 10 to 60% hydrogenated styrene/butadiene block copolymer having a low melt index, 20 to 80% liquid paraffin and 5 to 60% propylene resin. The cap is formed of metal or sometimes plastic and the liquid used in all of the examples is still water. The composition may be formed into a gasket by extrusion directly into the cap followed by in situ moulding or is preformed and then inserted into the cap. The caps are tested for their liquid leakage performance after full bottles of still water have been dropped onto their caps.

JP-A-3-134085 (1991) describes a gasket for a screw cap containing 60 to 80% ethylene polymer, 40 to 20% hydrogenated styrene/butadiene block copolymer and 0.1–0.5% higher fatty amide. The gasket is said to improve ethylene polymer-based compositions in terms of their sealing, stability and removal (by unscrewing) properties.

JP-A-3-182586 (1991) describes a gasket for a plastic cup comprising 100 parts polypropylene resin, 50 to 95 parts of hydrogenated styrene/butadiene block copolymer and 1.5 to 5 parts lubricant and up to 10 parts a softening agent such as paraffin. The compositions are said to have good adhesion to polypropylene caps and to be resistant to high temperatures obtaining during hot filling or sterilisation.

According to the invention there is provided a container of carbonated beverage closed with a crown cap having a gasket formed of a thermoplastic material characterised in that the thermoplastic material comprises a hydrogenated copolymer of styrene and conjugated diene or a functionalised derivative thereof.

The invention is of particular value where the gauge of the metal from which the crown cap is formed is relatively thin, for instance less than 0.25 mm, preferably less than 0.23 mm thick. The invention is of particular value where the crown is a twist-off crown.

The carbonated beverage may be beer which may be carbonated via fermentation processes and optionally additionally carbonated or may be carbonated mineral water or other beverage. The carbonation is usually at least 1.0 volume, preferably at least 2.0 volume eg 2.5 or 3.0 volumes or more for instance carbonated beverages are often up to 4.0 volumes. Beer is usually 2.3 to 2.7 volume. The hydrogenated copolymer gives an advantageous increase in venting pressure.

The invention is of value where the filled and capped container to which the crown is applied has to be heat treated, for instance heated to a temperature of at least 60° C. for a period greater than, for instance, 5 minutes or, more preferably, 20 minutes. For instance the invention is of particular value where the container is filled with a liquid and the closed container has to be pasteurised. Pasteurisation may for instance comprise heating the bottle to a temperature in the range 60 to 65° C. for 5 minutes or more. The closed bottle may be heated up to a temperature as high as 80° C. or more, though preferably no higher than 90° C.

The present invention also includes the use of a crown cap for application to a container filled with a carbonated beverage which is subsequently heat treated, especially where the cap is a twist-off cap.

The inventors have discovered that by the incorporation of the hydrogenated styrene-diene copolymer gaskets are formed having extremely good sealing properties which can resist leakage of gas even when subjected to internal pressures within the closed container of at least 5 bar, preferably at least 8 bar and which are thus particularly suitable as closures for carbonated beverages, including beers. Furthermore the gaskets are found to be high temperature resistant and are not subject to deterioration or leakage during heat treatment of a filled container. Furthermore the incorporation of the hydrogenated polymer improves, by increasing, the venting pressure obtainable, even before any heat treatment.

The gasket may allow venting of excess pressure within the bottle with the gasket resealing the bottle afterwards. This is of particular value when the contents of the bottle are beer, which may be subject to a second fermentation, or carbonated drinks, especially where the drinks may be stored outside, under a hot sun. The venting pressure may for instance in the range 7 to 10 bar. The use of the block copolymer in the present invention allows very good sealing and venting pressures to be achieved immediately on filling of a container and for such properties to be maintained even after any heat treatment, for instance pasteurisation. Furthermore the sealing is excellent where the cap is a relatively thin, twist-off crown, because of the improved resilience due to the incorporation of the hydrogenated copolymer, even after heat treatment.

The thermoplastic material used in the invention generally comprises less than 50% of the copolymer, and up to 40% is generally adequate. Improvement in properties can be observed with more than 1% by weight of copolymer. Preferably the amount of copolymer is in the range 2 to 30% by weight of the total composition.

The hydrogenated styrene-diene copolymer is preferably a block copolymer. The diene is for instance butadiene or isoprene. Suitable copolymers are styrene-ethylene-butylene-styrene block copolymer (hydrogenated styrene-butadiene-styrene) or styrene ethylene propylene-styrene block copolymer (hydrogenated styrene-isoprene-styrene copolymer). Functionalised derivatives of such materials include carboxylated derivatives, which may improve the comparability of with and adhesion to polar materials.

The invention is of particular value to improve the sealing properties of gaskets which are formed of a thermoplastic material comprising butyl rubber. The composition therefore preferably comprises 10 to 60% by weight, preferably 15 to 55% by weight, most preferably 20 to 50% by weight, of butyl rubber. The present invention is of particular value when the caps are used to seal bottles containing beer, especially where the gasket material comprises butyl rubber to reduce ingress of volatile contaminants e.g. chlorinated phenol ingress. The incorporation of butyl rubber may result in an undesirable decrease in venting pressure and incorporation of the hydrogenated copolymer allows the venting pressure to be increased to adequate levels. The invention is of particular value, for use in butyl-containing gaskets for crown caps for beer especially when high venting pressures are required.

Butyl rubber is a copolymer of isoprene and butylene. The molecular weights can be relatively low or relatively high. Generally it is linear but it can be cross-linked. Generally the rubber has a Mooney viscosity (ML 1+8 at 120° C.) of below 60 and preferably below 56.

The thermoplastic material is preferably substantially free of chlorinated olefin based polymer, especially PVC.

SEBS and SEPS are both found to be good for holding oil into the composition. The incorporation of oil into a gasket composition allows relatively soft compositions to be formed, but the oil must be retained within the gasket and not released into the liquid in a container close by the bottle.

The use of SEBS and SEPS allows these properties to be achieved. Accordingly the present invention allows oil to be incorporated in an amount such that the value of the raio of hydrogenated copolymer to oil is 1: (at least 0.5), preferably in the range 1:1 to 1:5, for instance in the range 1:2 to 1:4.

The thermoplastic material otherwise preferably comprises about 15 to 90% by weight of an olefin-based polymer, generally an ethylene or propylene or, less preferably, butylene, polymer or copolymer. Suitable polymers include polyethylene, especially low density polyethylene, ethylene-propylene copolymers, ethylene-acrylate copolymers, ethylene-vinyl alcohol copolymers and ethylene-vinyl acetate copolymers and polypropylene and polybutylene. Acrylate comonomer is generally an alkyl (meth)acrylate, for instance butyl acrylate.

The thermoplastic material preferably comprises 85–10% by weight of rubbery polymer polystyrene, ethylene-vinyl alcohol copolymers, ethylene vinyl acetate copolymers and/or ethylene-acrylate copolymers. Rubbery polymer is suitably selected from ethylene-propylene rubber acid modified ethylene propylene copolymers, butyl rubber, polybutadiene, styrene butadiene rubber, carboxylated styrene butadiene rubber, polyisoprene, styrene block copolymers such as styrene isoprene-styrene and styrene-butadiene-styrene.

The thermoplastic composition may further comprise additives such as filler, pigments, stabilisers, antioxidants and oils. The thermoplastic composition preferably comprises slip-aids and/or melt-release materials. Slip-aids, such as fatty amides or other materials such as those described in EP-A-0,129,309, are preferably included in an amount in the range 0.1 to 5%, preferably 0.2 to 2% by weight. A melt-release aid, which may be any of those described in EP-A-0,331,485, and is preferably included in the composition in an amount of at least 0.05% by weight up to 5% by weight.

The gasket may be a foamed gasket.

The process for forming the gasket into the cap can be any of those previously described for introducing other thermoplastic compositions into crown caps. Thus the process may include the insertion and bonding of a preformed disc into the cap, for instance with the cap being heated and with optional subsequent moulding (as in GB-A-1,112,023 and GB-A-1,112,025), flowing a molten composition into the cap whilst rotating the cap with optional subsequent moulding, adding the composition in particulate form to the cap followed by heating to melt the composition and then moulding the molten material.

Preferably the gasket is formed by introducing the material as a molten or semi-molten extrudate into the cap followed by cold moulding the material to form the gasket.

In the preferred process the moulding of the gasket forming material is preferably carried out using a die member, which is cooled to a temperature below that at which the material is extruded and/or at which the cap is maintained.

It is preferred to form a molten mix of the block copolymer and the other components of the thermoplastics gasket forming material, for instance by melting a preformed mix in a melt extruder, and to extrude the mix continuously and to transfer the desired pieces of molten mix directly from the point of extrusion to the individual cap. Processes of this general type are known as the HC (trade mark), the Sacmi (trade mark) and the Zapata (trade mark) processes. Such processes are described in, for instance, U.S. Pat. No. 4,277,431, EP-A-0,073,334, U.S. Pat. Nos. 3,705,122 and 4,518,336, and EP-A-0,207,385.

The gasket formed in the process may be a foamed gasket and the process will therefore include a foaming step. Foaming is generally carried out by including in the gasket forming composition a chemical foaming agent which is activated, usually by being subjected to raised temperature, during the process. Although foaming may be carried out before any moulding step, so that the moulding is carried out on a foamed composition, such a process is often found to knock some of the foam out of the composition. Preferably, therefore the foaming step is carried out after the moulding step. The foaming agent may be incorporated into a particulate gasket forming material by blending the foaming agent in powdered form with the other particulate thermoplastic materials. The foaming agent may be incorporated throughout a matrix of thermoplastic gasket forming material by melt blending of the material with particulate foaming agent below the activation temperature of the foaming agent. The blend may then be formed into a gasket by moulding the material in the cap and then heating the material to above the activation temperature of the foaming agent to foam the gasket.

The foaming agent used in the process is, for instance an azo compound which decomposes to form nitrogen gas, especially azodicarbonamide.

This process is further described in our co-pending application filed even date herewith (GJE reference 62/2373/01).

The invention is further illustrated in the following examples. In the examples the following abbreviations are used:

| | |
|---|---|
| WHO | White Oil |
| LDPE | Low density polyethylene |
| | Density 0.918 MFI (melt flow index) 7 |
| HDPE 1 | High density polyethylene density 0.95 MFI 10 |
| HDPE 2 | High density polyethylene density 0.95 MFI25 |
| HDPE 3 | High density polyethylene density 0.95 MFI11 |
| SIS | Styrene-isoprene-styrene block copolymer 15% styrene |
| SBS | Styrene-butadiene styrene block copolymer 29.5% styrene |
| SEBS | Styrene-ethylene-butylene-styrene linear copolymer 29% styrene |
| Butyl | Low molecular weight isoprene/butylene copolymer. Mooney viscosity (ML 1 + 8 at 110° C.) 43–47 |
| EVA | Ethylene-vinyl acetate copolymer 9% VA |
| EPR | Ethylene-propylene rubber 75% ethylene |

EXAMPLE 1

The above compositions were moulded into twist-off crowns to a film weight of 220 mg using a Sacmi PM 1000 crown lining machine. Eight crowns of each composition were closed on to 25 cl standard twist-off bottles containing carbonated water at 3.0 volumes. The bottles were pasteurised at 62° C. for 20 minutes and allowed to stand overnight. Their leakage pressure was then measured using an Owens-Illinois Secure Seal Tester. The Secure Seal Tester includes a probe which is used to puncture the cap and then pump gas into the bottle whilst recording the pressure inside the bottle. The pressure at which the seal fails is recorded. If the seal fails above the maximum pressure which can be safely applied (11–12 bar) the result is recorded as "11+" or 12+.

|         | Comparative | Invention |       |
|         | A           | B         | C     |
| ------- | ----------- | --------- | ----- |
| LDPE    | 40          | 35        | 35    |
| SIS     | 35          | 35        | 36    |
| SBS     | 17          | 17        | 17    |
| WHO     | 8           | 8         | 8     |
| SEBS    | —           | 5         | 4     |
| Leakage Pressure, bar | | | |
| Mean    | 7.4         | 9.7       | 9.9   |
| Range   | 5.9–10.3    | 8.6–11+   | 8.6–11+ |

This example indicates that the incorporation of SEBS increases the average leakage pressure and also the maximum and minimum leakage pressure exhibited by the series of bottles tested.

EXAMPLE 2

Using the same procedures as in Example 1 the following compositions were applied to standard crown caps and tested.

|         | Comparative | Invention |       |
|         | D           | E         | F     |
| ------- | ----------- | --------- | ----- |
| EVA     | 32          | 32        | 28    |
| SBS     | 43          | 43        | 43    |
| EPR     | 10          | 6         | 10    |
| WHO     | 15          | 15        | 15    |
| SEBS    | —           | 4         | 4     |
| Leakage Pressure, bar | | | |
| Mean    | 7.6         | 9.2       | 9.6   |
| Range   | 5.0–8.5     | 8.5–10.5  | 9.0–10.5 |

This example shows that, similarly to example 1, the incorporation of SEBS, this time into a composition based on EVA, SBS and EPR, improves the average leakage pressure and the minimum leakage pressure exhibited by the gaskets.

EXAMPLE 3

The following compositions are moulded into standard pry-off crowns. The crowns were tested as in Example 1 but without the step of pasteurisation.

|         | Comparative G | Invention H |
| ------- | ------------- | ----------- |
| HDPE 1  | 47            | 45          |
| Butyl   | 50            | 40          |
| Talc    | 3             | 3           |
| SEBS    | —             | 15          |
| Venting Pressure, bar | | |
| Mean    | 8.7           | 10.8        |
| Range   | 6.0–12+       | 8.5–12+     |

The results indicate that the incorporation of SEBS into a polyethylene/butyl composition increases the unpasteurised venting pressure of standard crowns.

EXAMPLE 4

The following compounds were moulded into standard pry-off crowns and then closed onto 330 ml glass bottles containing carbonated mineral water. The bottles were stored at room temperature for 10 days in a sealed container continuing p-dichlorobenzene (DCB). The concentration of DCB in the water was then measured.

|         | Comparative | Invention |       |       |
|         | I           | J         | K     | L     |
| ------- | ----------- | --------- | ----- | ----- |
| LDPE    | 85          | —         | —     | —     |
| HDPE 2  | —           | —         | 45    | 45    |
| HDPE 3  | —           | 50        | —     | —     |
| SBS     | 15          | —         | —     | —     |
| Butyl   | —           | 50        | 45    | 40    |
| SEBS    | —           | —         | 10    | 15    |
| Concentration of DCB/ppm | 400 | 70 | 80 | 120 |
| Mean Venting Pressures (bar) | 14.0 | 8.1 | 10.1 | 10.9 |

Each of the gaskets gave an adequate seal.

The results indicate that the incorporation of SEBS into a gasket comprising butyl rubber to reduce the permeability to DCB does not adversely affect the DCB ingress by more than a small degree.

I claim:

1. A container of a carbonated beverage closed with a crown cap having a gasket formed of a thermoplastic material characterised in that the thermoplastic material consists essentially of from 1 to 50% by weight of a hydrogenated copolymer of styrene and a conjugated diene or a functionalised derivative selected from the group consisting of styrene-ethylene-butylene-styrene copolymers and styrene-ethylene-propylene-styrene copolymers, said copolymers being operative for incorporating and retaining oil in said gasket thermoplastic material; an oil in an amount such that the ratio of said hydrogenated copolymer to oil is 1: to at least 0.5; and from 85 to 10% of a rubbery polymer selected from the group consisted of hydrogenated copolymers, polystyrenes, ethylene copolymers with vinylacetate or acrylates, butyl rubber, polybutadiene, styrene butadiene rubber, carboxylated styrene butadiene rubber, polyisoprene, styrene-isoprene-styrene copolymer, ethylene/propylene rubber and styrene butadiene styrene block copolymers; whereby the presence of said styrene-ethylene-butylene-styrene copolymers or said styrene-ethylene-propylene-styrene copolymers improves the venting pressure of said container closed with said crown cap and gasket when compared to a gasket comprising said rubbery polymer alone without said styrene-ethylene-butylene-styrene copolymers or said styrene-ethylene-propylene-styrene copolymers.

2. A carbonated beverage container closed with a crown cap having a gasket comprising:

a metal crown cap closed on a container containing a carbonated beverage, said crown cap having a gasket comprising a thermoplastic material substantially free of chlorinated olefin-based polymer, said gasket being operative to resist leakage of gas even when subjected to internal pressures within said closed container of at least 5 bar;

said thermoplastic material comprising an olefin polymer in an amount of 15 to 90% by weight of polymer in the gasket and selected from the group consisting of a polyethylene, polypropylene, an ethylene propylene copolymer, and an ethylene vinyl acetate copolymer; said thermoplastic material further comprising a rubbery polymer in the amount of 85–15% by weight of polymer in the gasket, said rubbery polymer being selected from the group consisting of an ethylene propylene rubber, a styrene-isoprene-styrene copolymer, a styrene-butadiene-styrene copolymer, and a butyl rubber; and said gasket further comprising a hydrogenated styrene-diene copolymer, in an amount of 1–50% by weight of polymer in said gasket, said hydrogenated copolymer being selected from the group consisting of a styrene-ethylene-butylene-styrene copolymer and a styrene-ethylene-propylene-styrene copolymer; said hydrogenated styrene-diene copolymer being operative in combination with said thermoplastic material, to increase the average leakage pressure and the minimum leakage pressure exhibited by the gasket, in comparison to a gasket containing said thermoplastic material but without said hydrogenated styrene-diene copolymer.

3. The container of claim 2 wherein said metal cap is a twist-off cap.

4. The container of claim 3 wherein the metal used to form said twist-off cap is less than 0.25 mm thickness.

5. The container of claim 2 wherein said metal cap is a pry-off cap which has to be levered off using an opening tool.

6. The container of claim 2 wherein said gasket further comprises a filler, pigment, stabilizer, antioxidant, slip-aid, melt-release aid, or an oil.

7. The container of claim 2 wherein said rubbery polymer is butyl rubber.

8. The container of claim 7 wherein said olefin is a low density polyethylene, said rubber polymer is butyl rubber, and said hydrogenated styrene-diene copolymer is a styrene-ethylene-butylene-styrene copolymer.

9. The container of claim 2 wherein said olefin is high density polyethylene.

10. A carbonated beverage container closed with a lid or cap having a sealant composition comprising:

a thermoplastic material comprising at least one of (1) an olefin material selected from the group consisting of a polyethylene, a propylene, an ethylene propylene copolymer, and an ethylene vinyl acetate copolymer; or (2) a rubbery polymer selected from the group consisting of ethylene propylene rubber, a styrene-isoprene-styrene copolymer, a styrene-butadiene-styrene copolymer, and a butyl rubber; and a hydrogenated styrene-diene copolymer selected from the group consisting of a styrene-ethylene-butylene-styrene copolymer and a styrene-ethylene-propylene-styrene copolymer, said hydrogenated styrene-diene copolymer being operative in combination with said thermoplastic material to increase the average leakage pressure and the minimum leakage pressure exhibited by the gasket in comparison to a gasket containing said thermoplastic material but without said hydrogenated styrene-diene copolymer.

11. The container of claim 10 wherein said gasket further comprises an oil incorporated into said gasket composition.

12. The container of claim 10 wherein said thermoplastic material is comprised of a polyethylene selected from the group consisting of a low density polyethylene and a high density polyethylene and said hydrogenated styrene-diene copolymer is styrene-ethylene-butylene-styrene.

13. The container of claim 10 wherein said container is closed with a twist-off cap.

* * * * *